(12) United States Patent
Kuriki

(10) Patent No.: US 8,845,764 B2
(45) Date of Patent: Sep. 30, 2014

(54) POWER STORAGE DEVICE COMPRISING SOLID ELECTROLYTE LAYER OVER ACTIVE MATERIAL AND SECOND ELECTROLYTE AND METHOD OF MANUFACTURING THE SAME

(75) Inventor: Kazutaka Kuriki, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 275 days.

(21) Appl. No.: 13/155,431

(22) Filed: Jun. 8, 2011

(65) Prior Publication Data

US 2011/0305958 A1 Dec. 15, 2011

(30) Foreign Application Priority Data

Jun. 14, 2010 (JP) ................. 2010-134641

(51) Int. Cl.
| | |
|---|---|
| H01M 10/04 | (2006.01) |
| H01M 10/056 | (2010.01) |
| B05D 5/12 | (2006.01) |
| H01G 9/025 | (2006.01) |
| H01G 9/15 | (2006.01) |
| H01M 10/052 | (2010.01) |
| H01M 4/38 | (2006.01) |
| H01M 12/08 | (2006.01) |
| H01M 10/0565 | (2010.01) |
| H01M 10/0562 | (2010.01) |

(52) U.S. Cl.
CPC ............ *H01G 9/025* (2013.01); *H01M 12/08* (2013.01); *Y02T 10/7011* (2013.01); *Y02T 10/7022* (2013.01); *H01M 10/052* (2013.01); *H01M 2300/0094* (2013.01); *H01M 2300/0082* (2013.01); *H01M 10/0565* (2013.01); *H01G 9/15* (2013.01); *H01M 2300/0068* (2013.01); *Y02E 60/122* (2013.01); *H01M 10/0562* (2013.01); *H01M 4/386* (2013.01); *H01M 10/056* (2013.01)
USPC ......... 29/623.5; 29/25.03; 429/311; 429/322; 429/307; 361/523; 427/58

(58) Field of Classification Search
USPC ......... 429/322, 304, 300, 233, 245, 238, 311, 429/231.95, 231.8, 307; 29/623.1, 623.5; 359/265; 361/523
See application file for complete search history.

(56) References Cited

U.S. PATENT DOCUMENTS

| | | | |
|---|---|---|---|
| 6,432,585 B1 * | 8/2002 | Kawakami et al. | ............ 429/233 |
| 6,685,804 B1 | 2/2004 | Ikeda et al. | |

(Continued)

FOREIGN PATENT DOCUMENTS

| | | |
|---|---|---|
| JP | 2001-210315 | 8/2001 |
| JP | 2002-083594 | 3/2002 |

(Continued)

OTHER PUBLICATIONS

N.G. Bukun, "Superionic Transitions in NASICON-Type Solid Electrolytes", Ionics 2 (1996), p. 63-68.*

(Continued)

*Primary Examiner* — Kenneth Douyette
(74) *Attorney, Agent, or Firm* — Nixon Peabody LLP; Jeffrey L. Costellia

(57) ABSTRACT

An object is to provide a power storage device with improved cycle characteristics and a method of manufacturing the power storage device. Another object is to provide an application mode of the power storage device for which the above power storage device is used. In the method of manufacturing the power storage device, an active material layer is formed over a current collector, a solid electrolyte layer is formed over the active material layer after a natural oxide film over the active material layer is removed, and a liquid electrolyte is provided so as to be in contact with the solid electrolyte layer. Accordingly, decomposition and deterioration of the electrolyte solution which are caused by the contact between the active material layer and the electrolyte solution can be prevented, and cycle characteristics of the power storage device can be improved.

16 Claims, 6 Drawing Sheets

(56) References Cited

U.S. PATENT DOCUMENTS

| | | | |
|---|---|---|---|
| 6,887,511 B1 | 5/2005 | Shima et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,410,728 B1 | 8/2008 | Fujimoto et al. | |
| 7,794,881 B1 | 9/2010 | Fujimoto et al. | |
| 2002/0076616 A1* | 6/2002 | Lee et al. | 429/300 |
| 2004/0161670 A1* | 8/2004 | Kawase et al. | 429/245 |
| 2009/0087727 A1* | 4/2009 | Harada et al. | 429/120 |
| 2009/0202911 A1* | 8/2009 | Fukuoka et al. | 429/231.8 |
| 2009/0263717 A1* | 10/2009 | Ramasubramanian et al. | 429/218.1 |
| 2009/0291371 A1* | 11/2009 | Konishiike et al. | 429/338 |
| 2010/0007937 A1* | 1/2010 | Widjaja et al. | 359/265 |
| 2011/0151290 A1 | 6/2011 | Cui et al. | |

FOREIGN PATENT DOCUMENTS

| | | | |
|---|---|---|---|
| JP | 2003-246700 | 9/2003 | |
| JP | 2004-281317 | 10/2004 | |
| WO | WO-2008/153564 A1 * | 12/2008 | H01M 6/24 |

OTHER PUBLICATIONS

Cui.L et al., "Crystalline-Amorphous Core-Shell Silicon Nanowires for High Capacity and High Current Battery Electrodes,", Nano Letters, 2009, vol. 9, No. 1, pp. 491-495.

Li-Feng Cui et al., "Crystalline-Amorphous Core-Shell Silicon Nanowires for High Capacity and High Current Battery Electrodes", Nano Lett (Nano Letters), 2009, vol. 9, No. 1, pp. 491-495.

T. I. Kamins et al., "Ti-catalyzed Si nanowires by chemical vapor deposition: Microscopy and growth mechanisms", J. Appl. Phys. (Journal of Applied Physics), vol. 89, No. 2, Jan. 15, 2001, pp. 1008-1016.

Hideo Kohno. et al., "Silicon Nanoneedles Grown by a Simple Thermal Treatment Using Metal-Sulfur Catalysts". Jpn. J. Appl. Phys. (Japanese Journal of Applied Physics), vol. 41, Part 1, No. 2A, Feb. 2002, pp. 577-578.

* cited by examiner

POWER STORAGE DEVICE COMPRISING SOLID ELECTROLYTE LAYER OVER ACTIVE MATERIAL AND SECOND ELECTROLYTE AND METHOD OF MANUFACTURING THE SAME

BACKGROUND OF THE INVENTION

1. Field of the Invention

The present invention relates to a power storage device and a method of manufacturing the power storage device.

Note that the power storage device refers to general elements that have a function of storing power or devices provided with such elements.

2. Description of the Related Art

In recent years, power storage devices such as lithium-ion secondary batteries, lithium-ion capacitors, and air batteries have been developed.

An electrode for the power storage device is manufactured by forming an active material layer on a surface of a current collector. For the active material layer, a material that can occlude and release ions serving as carriers, such as carbon or silicon, is used. In particular, the theoretical capacity of silicon or phosphorus-doped silicon is larger than that of carbon, and the use of these materials for the active material layer is preferable in terms of an increase in capacity of a power storage device (e.g., see Patent Document 1).

REFERENCE

[Patent Document 1] Japanese Published Patent Application No. 2001-210315

SUMMARY OF THE INVENTION

However, when silicon is formed on a surface of a current collector, an oxide film such as a natural oxide film which has low conductivity is formed on a silicon surface. Therefore, when silicon is used for a negative electrode active material layer, the function of the electrode might be impaired because the oxide film, such as a natural oxide film, having low conductivity which is formed on the silicon surface, is overloaded during charge and discharge. Thus, improvement in cycle characteristics of the power storage device has been hindered.

Further, because a passive state called an SEI (solid electrolyte interface) is not formed on a silicon surface unlike in use of carbon or the like, repeated charge and discharge using silicon as a negative electrode active material have had problems of the decomposition and deterioration of the electrolyte solution and impairment of the cycle characteristics of the power storage device.

In view of the above problems, an object of one embodiment of the present invention is to provide a power storage device with improved cycle characteristics and a method of manufacturing the power storage device.

Another object of one embodiment of the present invention is to provide an application mode of the power storage device for which the above power storage device is used.

According to one embodiment of the present invention, an active material layer is formed on a surface of a current collector, and a covering film of a solid electrolyte is formed on a surface of the active material layer after an oxide film such as a natural oxide film is removed, which is as detailed below.

One embodiment of the present invention is a method of manufacturing a power storage device, in which an active material layer is formed over a current collector, a solid electrolyte layer is formed over the active material layer after a natural oxide film over the active material layer is removed, and a liquid electrolyte is provided so as to be in contact with the solid electrolyte layer.

One embodiment of the present invention is a power storage device including a liquid electrolyte and an electrode that includes a current collector, an active material layer over the current collector, and a solid electrolyte layer over the active material layer and that is in contact with the liquid electrolyte in the solid electrolyte layer.

The above solid electrolyte layer can be formed as a layer including at least one of lithium phosphate, lithium iron phosphate, lithium manganese phosphate, lithium chromium phosphate, and lithium phosphorus sulfide.

The thickness of the above solid electrolyte layer is preferably greater than or equal to 1 nm and less than or equal to 100 nm.

The above active material layer can be formed as a layer including at least one of crystalline silicon and whisker-like crystalline silicon.

According to one embodiment of the present invention, after silicon is formed as a negative electrode active material layer on a surface of the current collector, the oxide film such as a natural oxide film is removed. Consequently, the conductivity of the electrode of the power storage device can be improved.

Furthermore, a solid electrolyte is formed on a surface of the active material layer after the removal of the oxide film such as a natural oxide film, so that decomposition and deterioration of the electrolyte solution which are caused by the contact between the active material layer and the electrolyte solution can be prevented, and cycle characteristics of the power storage device can be improved.

DETAILED DESCRIPTION OF THE INVENTION

Figure 1A:
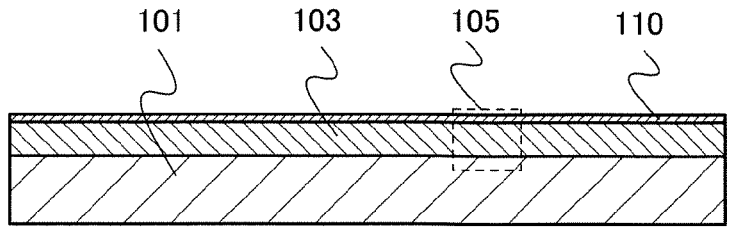
FIGS. 1A to 1D are cross-sectional views illustrating a method of manufacturing a negative electrode of a power storage device.

Hereinafter, embodiments will be described in detail using the accompanying drawings. Note that the present invention is not limited to the embodiments described below, and it is apparent to those skilled in the art that modes and details can be modified in various ways without departing from the spirit of the present invention disclosed in this specification and the like. Furthermore, structures according to different embodiments can be implemented in appropriate combination. Note also that in the structures described below, identical components or components having similar functions are denoted by the same reference numerals, the explanation of which is not repeated.

Note that the position, the size, the range, or the like of each structure illustrated in the drawings and the like is not accurately represented in some cases for easier understanding. Therefore, the disclosed invention is not necessarily limited to the position, size, range, or the like disclosed in the drawings and the like.

Embodiment 1

In this embodiment, an example of a method of manufacturing a power storage device will be described with reference to FIGS. 1A to 1D and FIG. 2.

First, a silicon layer is formed as an active material layer 103 over a current collector 101 (see FIG. 1A). Since a feature of the disclosed invention is suppression of deterioration in an electrolyte due to use of a material on which no SEI is formed, for the active material layer, this invention is effective even in the case where a material on which no SEI is formed (on which an SEI is difficult to form) other than silicon is used for the active material layer. In other words, other than silicon, a material on which no SEI is formed may be used for the active material layer 103.

For the current collector 101 which functions as a current collector of an electrode, a conductive material having a foil shape, a plate shape, or a net shape can be used. The current collector 101 can be formed with any of the following, for example: metal elements having high conductivity such as platinum, aluminum, copper, and titanium; aluminum alloys to which an element that improves heat resistance, such as silicon, titanium, neodymium, scandium, or molybdenum, is added; and metal elements that form silicide, such as zirconium, titanium, hafnium, vanadium, niobium, tantalum, chromium, molybdenum, tungsten, cobalt, and nickel. A semiconductor substrate such as a silicon wafer may be used as the current collector 101.

The silicon layer formed as the active material layer 103 can be formed by an evaporation method, a sputtering method, a plasma CVD method, a thermal CVD (chemical vapor deposition) method, a low-pressure CVD (LPCVD, low-pressure chemical vapor deposition) method, or the like. When the active material layer 103 is formed by a plasma CVD method, a thermal CVD method, or an LPCVD method, a deposition gas containing silicon can be used as a source gas. Examples of the deposition gas containing silicon are silicon hydride, silicon fluoride, silicon chloride, and the like and typically are $SiH_4$, $Si_2H_6$, $SiF_4$, $SiCl_4$, $Si_2Cl_6$, and the like. Note that a rare gas (such as helium, neon, argon, or xenon), nitrogen, hydrogen, or the like may be mixed in the source gas.

An impurity element imparting one conductivity type, such as phosphorus or boron, may be added to the silicon layer formed as the active material layer 103. By the addition of the impurity element imparting one conductivity type, such as phosphorus or boron, the conductivity of the silicon layer is increased. Accordingly, the conductance of the electrode can be increased, and discharge capacity can also be increased. In the case where the active material layer 103 is formed by a plasma CVD method, a thermal CVD method, or an LPCVD method, film formation can be performed in an atmosphere containing the impurity element imparting one conductivity type, such as phosphorus or boron. For example, for the addition of phosphorus to the silicon layer, a material gas containing phosphine is used in the film formation. When the active material layer 103 is formed by an evaporation method or a sputtering method, the silicon layer which is the active material layer 103 can be doped with the impurity element imparting one conductivity type, such as phosphorus or boron.

The silicon layer formed as the active material layer 103 is preferably formed by an LPCVD method. This is due to the following fact: the use of an LPCVD method enables supply of active species of the source gas to the silicon layer that is being deposited so that a region lacking silicon (a sparse region) can be prevented from remaining in the silicon layer even if such a region is formed by diffusion of silicon from the silicon layer into the current collector 101. Thus, a low-density region is not formed between the current collector 101 and the active material layer 103, so that electron transport at the interface between the current collector 101 and the active material layer 103 can be facilitated. In addition, the adhesion between the current collector 101 and the active material layer 103 can be increased. Further, with the use of vapor-phase growth for formation of the silicon layer over the current collector 101, the productivity of the power storage device is increased. Note that oxygen and the like due to a chamber of an LPCVD apparatus might be contained as an impurity in the active material layer 103.

There is no particular limitation on the crystallinity of the silicon layer formed as the active material layer 103. For example, the silicon layer may be an amorphous silicon layer, a microcrystalline silicon layer, a polycrystalline silicon layer, or the like. Further, the silicon layer may be subjected to a crystallization step. In the case where the silicon layer may be subjected to a crystallization step, after the hydrogen concentration in the silicon layer is sufficiently reduced, the silicon layer may be crystallized by being subjected to heat treatment at temperature at a level where the heat treatment can be performed or subjected to laser light irradiation. Note that, cycle characteristics of the electrode can be more improved by use of a polycrystalline silicon layer as the active material layer 103 than by use of an amorphous silicon layer.

Next, an oxide film formed on a surface of the active material layer 103, such as a natural oxide film, is removed. Because of its low conductivity, the oxide film is overloaded if present during charge and discharge. By the removal of the oxide film, the function of the electrode can be improved, and cycle characteristics of the power storage device can also be improved.

As methods for the removal of the oxide film, a wet etching process, a dry etching process, and a combination of both are given. An example of the wet etching process is etching for which a solution containing hydrofluoric acid or an aqueous solution containing hydrofluoric acid is used as an etchant. Examples of the dry etching process are a parallel plate RIE (reactive ion etching) method, an ICP (inductively coupled plasma) etching method, and the like.

Next, a solid electrolyte layer 110 is formed over the active material layer 103 (see FIG. 1A). Since a SEI (solid electrolyte interface) cannot be formed on a surface of the silicon layer formed as the active material layer 103, the formation of the solid electrolyte layer 110 can prevent decomposition and deterioration of an electrolyte solution.

The thickness of the solid electrolyte layer 110 is, for example, greater than or equal to 1 nm and less than or equal to 100 nm, preferably less than or equal to 50 nm. When the thickness of the solid electrolyte layer 110 is greater than or equal to 1 nm and less than or equal to 100 nm, the decomposition and deterioration of the electrolyte solution which are caused by contact between the electrode and the electrolyte solution can be prevented. If the thickness of the solid electrolyte layer 110 is less than 1 nm, a surface of the active material layer cannot be sufficiently covered; therefore, the thickness is preferably 1 nm or more in order to prevent the decomposition and deterioration of the electrolyte solution. Furthermore, if the thickness is greater than or equal to 100 nm, the cycle characteristics are impaired because the motion of ions is slow in the solid electrolyte layer 110; thus, a thickness greater than or equal to 100 nm of the solid electrolyte layer 110 is not appreciate.

For the solid electrolyte layer 110, any of the following can be used: oxides of lithium such as lithium phosphate ($Li_xPO_y$), lithium iron phosphate ($Li_xFe_y(PO_4)_z$), lithium manganese phosphate ($Li_xMn_y(PO_4)_z$), lithium nickel phosphate ($Li_xNi_y(PO_4)_z$), and lithium chromium phosphate ($Li_xCr_y(PO_4)_z$); phosphorus sulfide compounds such as lithium phosphorus sulfide ($Li_xPS_y$); and the like (x, y, and z are positive real numbers). Further, the solid electrolyte layer 110 may have a single-layer structure or a stacked structure. In this embodiment, the solid electrolyte layer 110 is formed using lithium phosphate as a single-layer structure.

Furthermore, the solid electrolyte layer 110 can be formed by a sputtering method, for example. When lithium phosphate is formed for the solid electrolyte layer 110 by a sputtering method, a target composed of at least $L_1$ and $PO_4$, which is used as a sputtering target, can be sputtered with an ion of a rare gas or the like. An example of the composition of the sputtering target is $Li_xFe_y(PO_4)_z$ as a general formula and specifically $Li_3Fe_2(PO_4)_3$. A material forming the target may be a mixed material, an example of which is a mixture of $Li_3Fe_2(PO_4)_3$ and $Fe_2O_3$. For the target, lithium iron phosphate having a NASICON structure is preferably used, and thus the solid electrolyte layer 110 can be formed using an inexpensive and stable target.

As the above sputtering method, an RF sputtering method using a high frequency power supply, a DC sputtering method using a DC power supply, a pulsed DC sputtering method in which a DC bias is applied in a pulsed manner, or the like can be employed. As a gas for the sputtering, a rare gas, oxygen, a mixed gas of a rare gas and oxygen, or the like can be used. As the rare gas, argon or the like can be used.

Figure 1B:
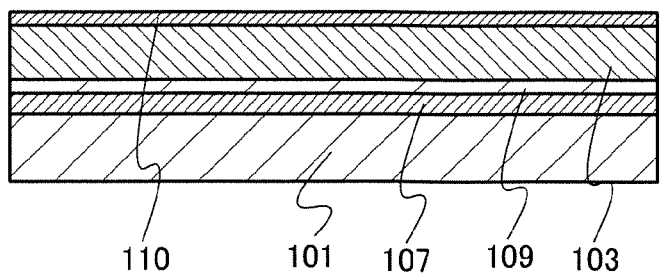

FIG. 1B illustrates an enlarged view of a region 105 including part of the current collector 101, part of the active material layer 103, and part of the solid electrolyte layer 110. When the active material layer 103 is formed, a mixed layer 107 might be formed between the current collector 101 and the active material layer 103, as illustrated in FIG. 1B. The mixed layer 107 is formed by diffusion of silicon into the current collector 101 due to heating for the formation of the silicon layer as the active material layer 103. In addition, the mixed layer 107 is formed with a metal element or silicon which is contained in the current collector 101, or the like.

In the case where a metal element that forms silicide is used to form the current collector 101, the mixed layer 107 is formed with one or more of zirconium silicide, titanium silicide, hafnium silicide, vanadium silicide, niobium silicide, tantalum silicide, chromium silicide, molybdenum silicide, tungsten silicide, cobalt silicide, nickel silicide, and the like. The mixed layer 107 may be formed with an alloy of a metal element and silicon.

When the mixed layer 107 is formed between the current collector 101 and the active material layer 103, resistance between the current collector 101 and the active material layer 103 is reduced; thus, the conductance of the electrode can be increased. Accordingly, the discharge capacity can be increased. In addition, the adhesion between the current collector 101 and the active material layer 103 can be increased and deterioration of the electrode can be reduced, so that the cycle characteristics of the power storage device can be improved.

As illustrated in FIG. 1B, a metal oxide layer 109 containing the above metal element might be formed over the mixed layer 107. This is because oxygen is desorbed from the chamber made of quartz in the LPCVD apparatus and the current collector 101 is oxidized, in the case where the silicon layer formed as the active material layer 103 is formed by an LPCVD method. For example, when titanium, zirconium, niobium, tungsten, or the like is used to form the current collector 101, the metal oxide layer 109 is formed with an oxide semiconductor such as titanium oxide, zirconium oxide, niobium oxide, or tungsten oxide, so that the resistance between the current collector 101 and the active material layer 103 is reduced; thus, the conductance of the electrode can be increased and the discharge capacity can be increased.

Note that the formation of the metal oxide layer 109 can be prevented when the chamber of the LPCVD apparatus is filled with a rare gas (such as helium, neon, argon, or xenon), nitrogen, or the like in the formation of the silicon layer by an LPCVD method.

Figure 1C:
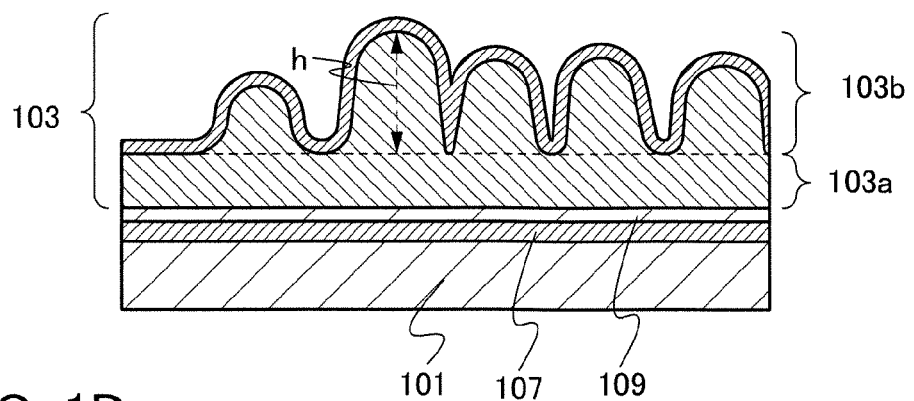

Further, by using an LPCVD method, the silicon layer formed as the active material layer 103 can be formed so as to include a crystalline silicon region 103a and a crystalline silicon region 103b including whiskers over the crystalline silicon region 103a (see FIG. 1C).

For example, a deposition gas containing silicon as a source gas can be used for formation of the active material layer 103 including the crystalline silicon region 103a and the crystalline silicon region 103b including whiskers. Examples of the deposition gas containing silicon are silicon hydride, silicon fluoride, silicon chloride, and the like and typically are $SiH_4$, $Si_2H_6$, $SiF_4$, $SiCl_4$, $Si_2Cl_6$, and the like. Note that a rare gas (such as helium, neon, argon, or xenon), nitrogen, hydrogen, or the like may be mixed in the source gas. Further, the formation of the active material layer 103 can be conducted while heating is performed at a temperature greater than 550° C. and less than the temperatures that the LPCVD apparatus and the current collector 101 can withstand (preferably a temperature greater than or equal to 580° C. and less than 650° C.).

Note that a boundary between the crystalline silicon region 103a and the crystalline silicon region 103b including whiskers is not clear. In this embodiment, a plane that includes valleys formed between whiskers is referred to as the boundary between the crystalline silicon region 103a and the crystalline silicon region 103b including whiskers.

For the whiskers in the crystalline silicon region 103b, a column-like shape such as a cylinder or a prism, or a cone-like shape or a needle-like shape such as a circular cone or a pyramid may be used as far as the whiskers are crystalline protrusions. In addition, a rounded shape may be used for the top portions of the whiskers. Further, the diameter of each whisker is greater than or equal to 50 nm and less than or equal to 10 μm, preferably greater than or equal to 500 nm and less than or equal to 3 μm, at the boundary between the crystalline silicon regions 103a and 103b.

Here, the length h of the whisker illustrated in FIG. 1C refers to the size of the whisker in the growth direction (longside direction). For example, given that the whisker has a column-like shape, the length refers to the distance between top and bottom surfaces; and given that the whisker has a cone-like shape, the length refers to the distance between the apex and the bottom surface. In addition, the thickness of the crystalline silicon layer refers to the sum of the thickness of the crystalline silicon region 103a and the thickness of the crystalline silicon region 103b including whiskers. The thickness of the crystalline silicon region 103b including whiskers refers to the distance from the point at which the whiskers reach their maximum height to a point on the boundary between the crystalline silicon region 103a and the crystalline silicon region 103b including whiskers. Note that here, the long-side direction may refer to the growth direction of the whisker (the direction in which the whisker extends from the crystalline silicon region 103a), and a long-side cross-sectional shape may refer to a cross-sectional shape along the long-side direction. In addition, a sliced cross-sectional shape may refer to the shape of a cross section in which the long-side direction is a normal direction.

As illustrated in FIG. 1C, the long-side directions of the whiskers may be one direction, for example, the normal direction to a surface of the crystalline silicon region 103a. Note that in this case, the long-side directions of the protrusions can be substantially the same as the normal direction to the surface of the crystalline silicon region 103a. That is, the long-side cross-sectional shapes of the whiskers are mainly illustrated in FIG. 1C.

Figure 1D:
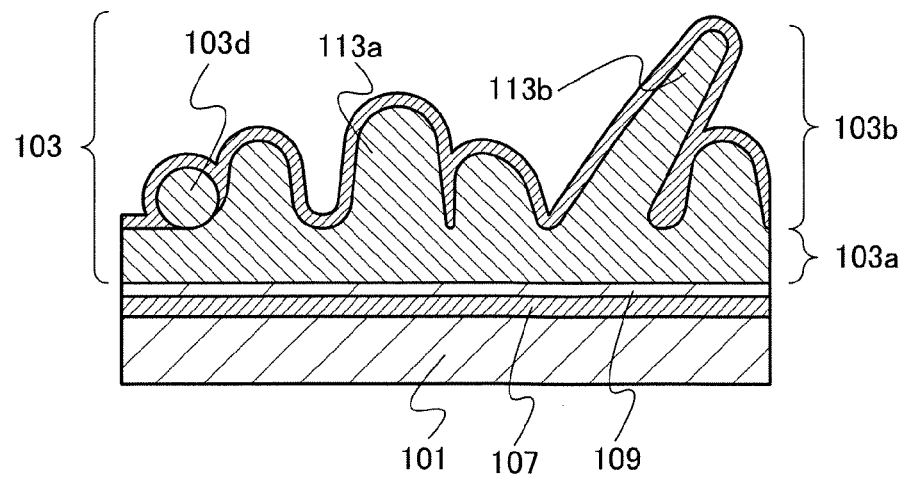

As illustrated in FIG. 1D, the long-side directions of the whiskers may be varied. Typically, a first whisker 113a whose long-side direction is substantially the same as the normal direction to the surface of the crystalline silicon region 103a and a second whisker 113b whose long-side direction is different from the normal direction may be included. Further, the second whisker may be longer than the first whisker. That is, in FIG. 1D, a whisker having a sliced cross-sectional shape like a region 103d coexists with the whisker having the long-side cross-sectional shape. The region 103d is circular because it is a sliced cross-sectional shape of a whisker having a cylinder shape or a circular cone shape; however, the region 103d is polygonal if the whisker has a prism shape or a pyramid shape. When the long-side directions of the whiskers are varied, the whiskers might tangle with each other and accordingly they are difficult to detach in charge and discharge of the power storage device.

As described above, in the electrode fabricated in this embodiment, the oxide film having low conductivity which is formed on the surface of the active material layer 103 is removed, and the solid electrolyte layer 110 is formed over the active material layer 103. Consequently, the conductivity of the electrode is improved, and the decomposition and deterioration of the electrolyte solution which are caused by contact between the electrode and the electrolyte solution can be reduced. Moreover, use of such an electrode can bring about an improvement in cycle characteristics of the power storage device.

Furthermore, when the mixed layer 107 is formed between the current collector 101 and the active material layer 103 (silicon layer), electric resistance due to the interface between the current collector 101 and the active material layer 103 can be reduced, and the adhesion between the current collector 101 and the active material layer 103 can be increased. Accordingly, the discharge capacity can be increased and deterioration of the power storage device can be reduced.

Figure 2:
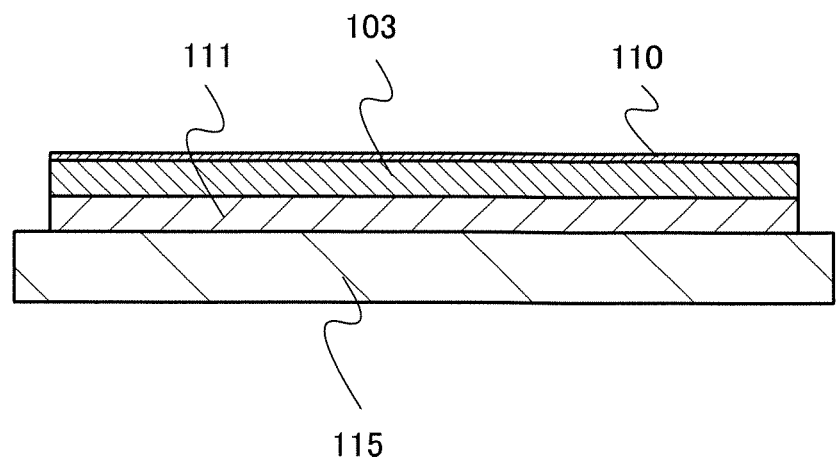
FIG. 2 is a cross-sectional view illustrating a method of manufacturing a negative electrode of a power storage device.

Although the mode in which the current collector 101 is formed with a conductive material having a foil shape, a plate shape, or a net shape is illustrated in FIGS. 1A to 1D, a current collector 111 may be formed over a substrate 115 as illustrated in FIG. 2 by a sputtering method, an evaporation method, a printing method, an inkjet method, a CVD method, or the like as appropriate.

This embodiment can be implemented in combination with a structure, a method, or the like described in any of the other embodiments.

Embodiment 2

In this embodiment, a structure of the power storage device will be described. First, a structure of a secondary battery which is an example of a power storage device will be described with reference to FIGS. 3A and 3B. In this embodiment, a lithium ion battery using a metal oxide containing lithium such as $LiCoO_2$, which has a large discharge capacity and high safety, will be described.

Figure 3A:
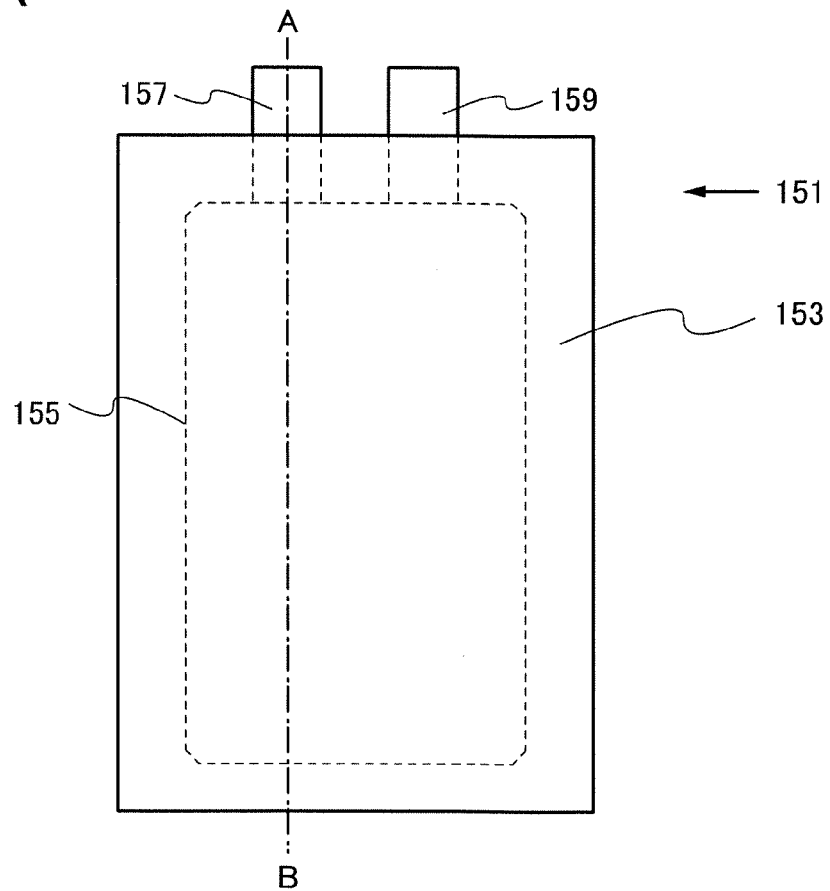
FIGS. 3A and 3B are a plan view and a cross-sectional view, respectively, illustrating one embodiment of a power storage device.
Figure 3B:
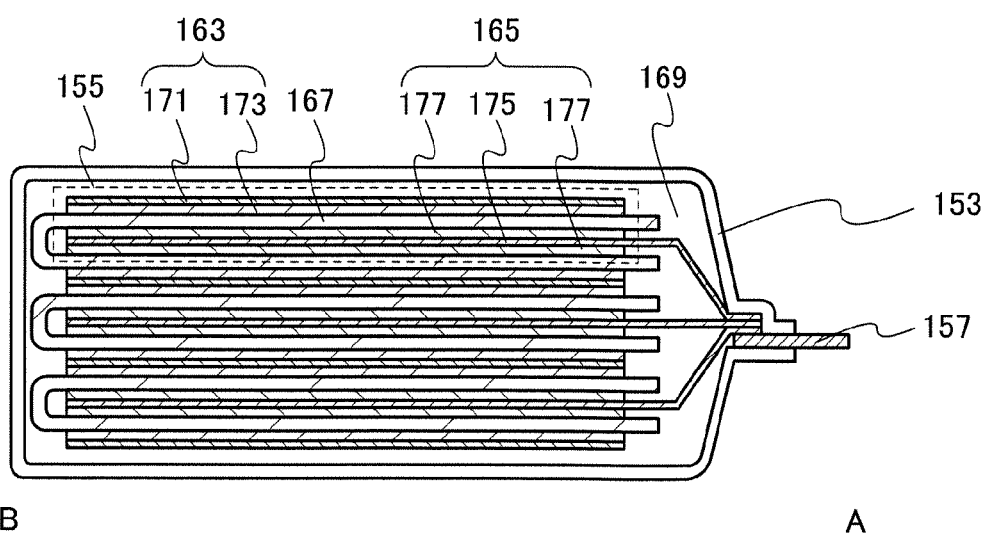

A plan view of a power storage device 151 is illustrated in FIG. 3A, and a cross-sectional view taken along the alternate long and short dashed line A-B in FIG. 3A is illustrated in FIG. 3B.

The power storage device 151 includes an exterior member 153, a power storage cell 155, and terminal portions 157 and 159 which are connected to the power storage cell 155 (see FIG. 3A). The interior of the power storage cell 155 has a negative electrode 163, a positive electrode 165, a separator 167 provided between the negative electrode 163 and the positive electrode 165, and an electrolyte 169 filling through the separator 167 (see FIG. 3B). Note that for the exterior member 153, a material such as a laminate film, a polymer film, a metal film, a metal case, or a plastic case can be used.

Further, the power storage device 151 may be a sealed thin power storage device as illustrated in FIGS. 3A and 3B, and may be a button power storage device, a cylindrical power storage device, a rectangular power storage device, or the like. Furthermore, although the structure where the positive electrode, the negative electrode, and the separator are stacked is described in this embodiment, a structure where the positive electrode, the negative electrode, and the separator are rolled may be used.

The negative electrode 163 includes a negative electrode current collector 171 and a negative electrode active material layer 173. The positive electrode 165 includes a positive electrode current collector 175 and a positive electrode active material layer 177. The negative electrode active material layer 173 or the positive electrode active material layer 177 is formed on one of surfaces of the negative electrode current collector 171 or one of surfaces of the positive electrode current collector 175.

The negative electrode current collector 171 is connected to the terminal portion 159. The positive electrode current collector 175 is connected to the terminal portion 157. Further, the terminal portion 157 and the terminal portion 159 each partly extend outside the exterior member 153.

For the negative electrode current collector 171, the current collector 101 (see FIGS. 1A to 1D) and the current collector 111 (see FIG. 2) which are described in Embodiment 1 can be used. Further, for the negative electrode active material layer 173, the active material layer 103 formed with the silicon layer (see FIGS. 1A to 1D and FIG. 2) which is described in Embodiment 1 can be used. Note that the silicon layer may be pre-doped with lithium.

For the positive electrode current collector 175, a material such as aluminum or stainless steel can be used. In addition, as the shape of the positive electrode current collector 175, a foil shape, a plate shape, a net shape, or the like can be used.

For the positive electrode active material layer 177, a lithium compound such as $LiFeO_2$, $LiCoO_2$, $LiNiO_2$, $LiMn_2O_4$, $LiFePO_4$, $LiCoPO_4$, $LiNiPO_4$, or $LiMn_2PO_4$, or a material such as $V_2O_5$, $Cr_2O_5$, or $MnO_2$ can be used. In addition, when carrier ions are ions of alkaline earth metals or alkali metals other than lithium, for example, an alkali metal such as sodium or potassium, beryllium, magnesium, or an alkaline earth metal such as calcium, strontium, or barium may be used instead of lithium in a lithium compound in the positive electrode active material layer 177.

As a solute of the electrolyte 169, a material in which transport of lithium ions that are carrier ions is possible and the lithium ions are stably present, for example, a lithium salt such as $LiClO_4$, $LiAsF_6$, $LiBF_4$, $LiPF_6$, or $Li(C_2F_5SO_2)_2N$ can be used. In addition, when carrier ions are ions of alkaline earth metals or alkali metals other than lithium, it is possible to use any of the following as the solute of the electrolyte 169: alkali metal salts such as sodium salts and potassium salts; beryllium salts; magnesium salts; and alkaline earth metal salts such as calcium salts, strontium salts and barium salts can be used.

As the solvent of the electrolyte 169, a material in which transport of lithium ions that are carrier ions is possible can be used, and an aprotic organic solvent is preferably used. Examples of the aprotic organic solvent that can be used are ethylene carbonate, propylene carbonate, dimethyl carbonate, diethyl carbonate, γ-butyrolactone, acetonitrile, dimethoxyethane, tetrahydrofuran, and the like. As the solvent of the electrolyte 169, one or more of materials can be used. By using a polymer that undergoes gelation as the solvent of the electrolyte 169, safety including leakproof properties is enhanced, and the power storage device 151 can be made thinner and more lightweight. Examples of the polymer that undergoes gelation are silicon gels, acrylic gels, acrylonitrile gels, polyethylene oxides, polypropylene oxides, fluorine-based polymers, and the like.

An insulating porous material can be used for the separator 167. Examples of the separator 167 are cellulose (paper), polyethylene, polypropylene, and the like.

In a power storage device having a structure as described above, the memory effect is small, the energy density is high, the discharge capacity is large, and the operation voltage is high. Accordingly, the size and weight of the power storage device can be reduced. Further, a reduction in deterioration due to repetitive charge and discharge allows use for a long time, so that cost can be reduced.

Next, a structure of a capacitor which is another example of a power storage device will be described. Examples of the capacitor are a double-layer capacitor, a lithium ion capacitor, and the like. The lithium ion capacitor will be described below.

The lithium ion capacitor can be formed using, for example, a material capable of reversibly occluding at least one of lithium ions and anions, such as active carbon, a conductive polymer, or a polyacene organic semiconductor (PAS), instead of the positive electrode active material layer 177 described in FIGS. 3A and 3B.

The lithium ion capacitor has high efficiency of charge and discharge, capability of rapid charge and discharge, and a long lifetime to withstand repeated use.

Also for the above capacitor, by using the electrode which is described as a negative electrode in Embodiment 1 and includes the current collector, the active material layer, and a layer having conductivity, or the like, a power storage device with improved cycle characteristics can be fabricated.

Another embodiment of the power storage device according to the present invention is an air battery. As a negative electrode of the air battery, the electrode which is described in Embodiment 1 and includes the current collector and the active material layer can be used, so that a power storage device with improved cycle characteristics can be formed.

This embodiment can be implemented in combination with a structure, a method, or the like described in any of the other embodiments.

Embodiment 3

In this embodiment, an application example of the power storage device described in Embodiment 2 will be described with reference to FIG. 4.

The power storage device described in Embodiment 2 can be used in electronic devices, for example, cameras such as digital cameras or video cameras, digital photo frames, mobile phones (also referred to as cellular phones or cellular phone devices), portable game machines, portable information terminals, or audio reproducing devices. Further, the power storage device can be used in electric propulsion vehicles such as electric vehicles, hybrid vehicles, electric railway vehicles, maintenance vehicles, carts, or wheelchairs. Here, as a typical example of the electric propulsion vehicles, a wheelchair is described (see FIG. 4).

Figure 4:
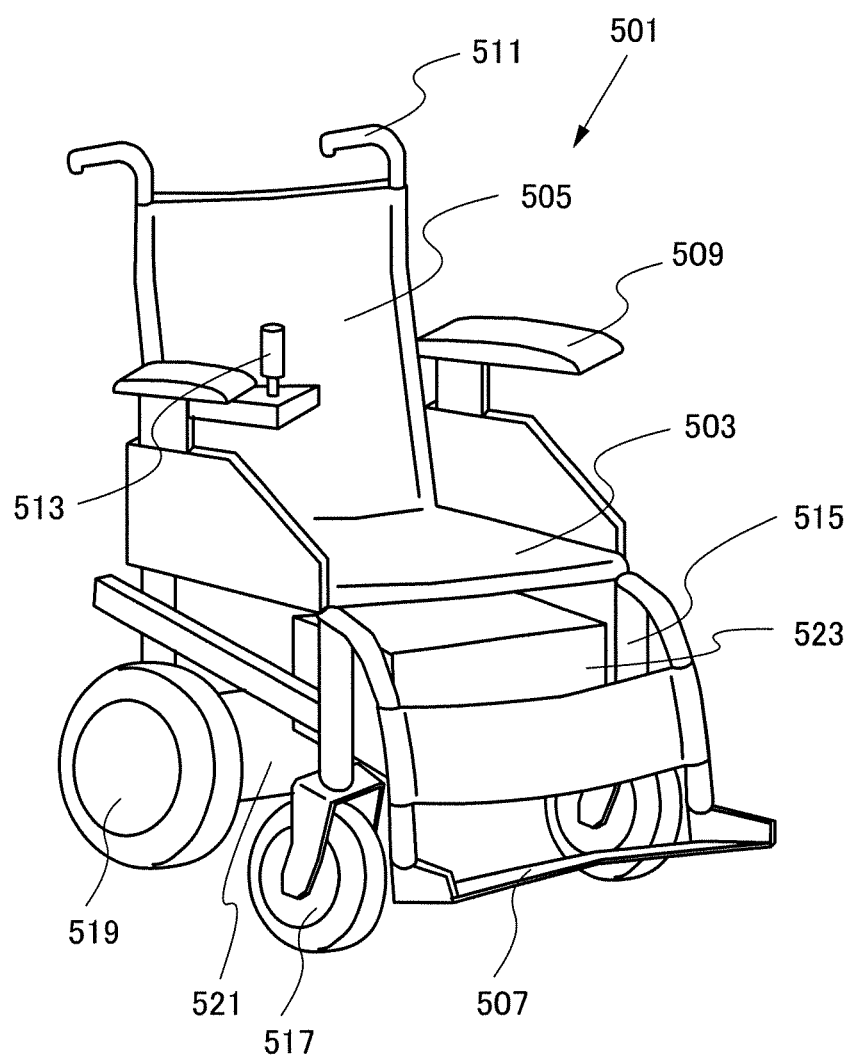
FIG. 4 is a perspective view illustrating an application example of a power storage device.

FIG. 4 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like is provided under the seat 503. The control portion 523 is connected to the controller 513 and the driving portion 521. The driving portion 521 is driven through the control portion 523 with the operation of the controller 513 by the user, and thus the operation of moving forward, moving backward, turning around, and the like, and the speed of the electric wheelchair 501 are controlled.

In this embodiment, the power storage device described in Embodiment 2 can be used as the power source of the control portion 523. The power source of the control portion 523 can be externally charged by electric power supply using plug-in systems or contactless power feeding. Further, in the case where the electric propulsion vehicle is an electric railway vehicle, the electric railway vehicle can be charged by electric power supply from an overhead cable or a conductor rail.

This embodiment can be implemented in combination with a structure, a method, or the like described in any of the other embodiments.

Embodiment 4

In this embodiment, an example in which the secondary battery according to one embodiment of the present invention is used in a wireless power feeding system (hereinafter referred to as an RF power feeding system) will be described with reference to block diagrams in FIG. 5 and FIG. 6. In each of the block diagrams in FIG. 5 and FIG. 6, independent blocks show elements within a power receiving device and a power feeding device, which are classified according to their functions. However, it may be practically difficult to completely separate the elements according to their functions and one element can involve a plurality of functions in some cases.

First, the RF power feeding system is described with reference to FIG. 5.

A power receiving device 600 is included in an electronic device, an electric propulsion vehicle, or the like which is driven by electric power supplied from a power feeding device 700, and can be applied to another device which is driven by electric power, as appropriate. Typical examples of the electronic device are cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles are electric vehicles, hybrid vehicles, electric railway vehicles, maintenance vehicles, carts, wheelchairs, and the like. In addition, the power feeding device 700 has a function of supplying electric power to the power receiving device 600.

Figure 5:
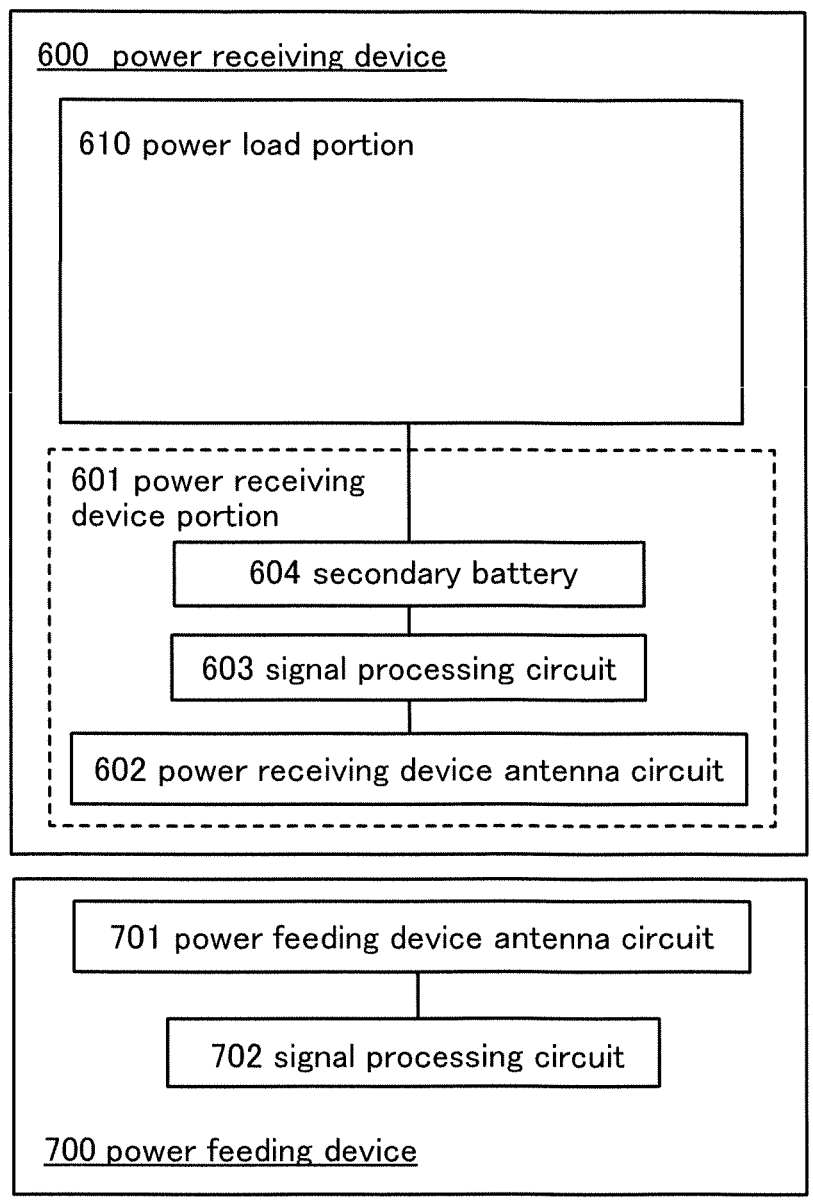
FIG. 5 is a diagram illustrating a configuration of a wireless power feeding system.

In FIG. 5, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 are a motor, a driving circuit, and the like, and other devices that drive the power receiving device by receiving electric power can be used as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system in FIG. 5.

With the use of the secondary battery according to one embodiment of the present invention in the RF power feeding system, the amount of power storage can be made larger than that in a conventional secondary battery. Therefore, the time interval of the wireless power feeding can be lengthened (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional secondary battery. Therefore, the total cost can be reduced.

Next, another example of the RF power feeding system is described with reference to FIG. 6.

Figure 6:
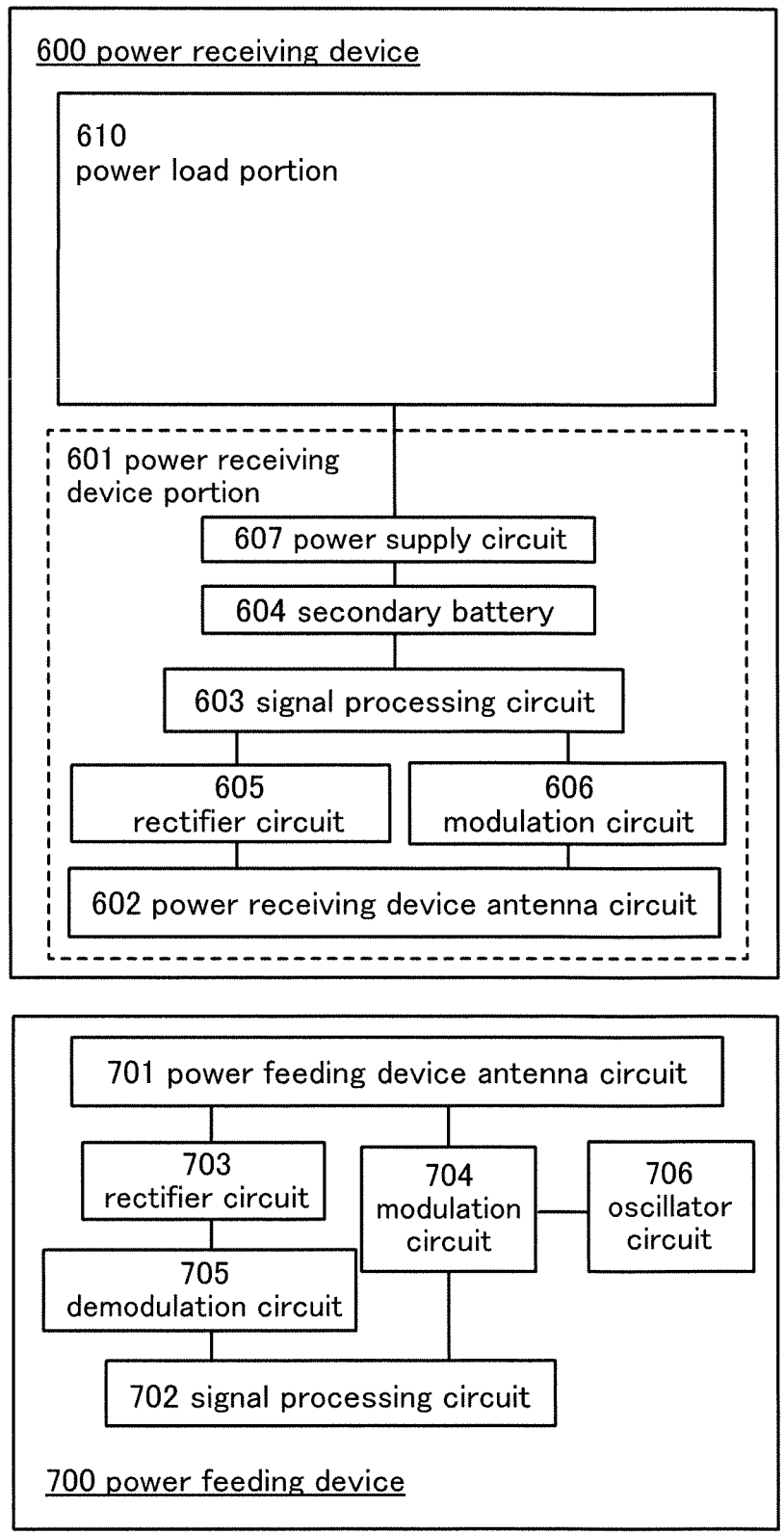
FIG. 6 is a diagram illustrating a configuration of a wireless power feeding system.

In FIG. 6, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When a signal transmitted by the power feeding device antenna circuit 701 is received, the rectifier circuit 605 has a function of generating a DC voltage from the signal received by the power receiving device antenna circuit 602. The signal processing circuit 603 has a function of processing a signal received by the power receiving device antenna circuit 602 and controlling charging of the secondary battery 604 and supplying of electric power from the secondary battery 604 to the power supply circuit 607. The power supply circuit 607 has a function of converting voltages stored by the secondary battery 604 into voltages needed for the power load portion 610. The modulation circuit 606 is used when a certain response signal is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when the amount of charged power in the power receiving device 600 is judged and a certain amount of power is charged, a signal is transmitted from the power receiving device 600 to the power feeding device 700 so that power feeding from the power feeding device 700 to the power receiving device 600 can be stopped. As a result, the secondary battery 604 is not fully charged, so that the number of charge times of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device. The oscillator circuit 706 generates a signal with a constant frequency. The modulation circuit 704 has a function of applying a voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 has a function of rectifying the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any other circuits may be provided between circuits as far as the RF power feeding can be performed. For example, after the power receiving device 600 receives a signal and the rectifier circuit 605 generates a DC voltage, a circuit such as a DC-DC converter or a regulator that is provided in a subsequent stage may generate a constant voltage. Thus, overvoltage application to the inside of the power receiving device 600 can be suppressed.

A secondary battery according to one embodiment of the present invention is used as the secondary battery 604 included in the power receiving device 600 in the RF power feeding system in FIG. 6.

With the use of the secondary battery according to one embodiment of the present invention in the RF power feeding system, the amount of power storage can be made larger than that in a conventional secondary battery. Therefore, the time interval of the wireless power feeding can be lengthened (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional secondary battery. Therefore, the total cost can be reduced.

When the secondary battery according to one embodiment of the present invention is used in the RF power feeding system and the power receiving device antenna circuit 602 and the secondary battery 604 are overlapped with each other, it is preferable that the impedance of the power receiving device antenna circuit 602 be not changed by deformation of the secondary battery 604 due to charge and discharge of the secondary battery 604 and deformation of an antenna due to the above deformation. This is because, when the impedance of the antenna is changed, in some cases, electric power is not supplied sufficiently. For example, the secondary battery 604 may be placed in a battery pack formed using metal or ceramics. Note that in that case, the power receiving device antenna circuit 602 and the battery pack are preferably separated from each other by several tens of micrometers or more.

In addition, the charging signal has no limitation on its frequency and may have any band of frequency as far as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be selected as appropriate from a variety of methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be implemented in combination with a structure, a method, or the like described in any of the other embodiments. This application is based on Japanese Patent Application serial No. 2010-134641 filed with the Japan Patent Office on Jun. 14, 2010, the entire contents of which are hereby incorporated by reference.

What is claimed is:

1. A method of manufacturing a power storage device, comprising the steps of:
    forming an active material layer comprising a silicon whisker over a current collector, the active material layer being formed by CVD method;
    removing a natural oxide film over the active material layer;
    forming a solid electrolyte layer over the active material layer by sputtering lithium iron phosphate after the natural oxide film is removed; and
    providing a second electrolyte so as to be in contact with the solid electrolyte layer.

2. The method of manufacturing the power storage device, according to claim 1,
    wherein the solid electrolyte layer is a layer comprising at least one of lithium phosphate, lithium manganese phosphate, lithium chromium phosphate, and lithium phosphorus sulfide.

3. The method of manufacturing the power storage device, according to claim 1,
    wherein a thickness of the solid electrolyte layer is greater than or equal to 1 nm and less than or equal to 100 nm.

4. The method of manufacturing the power storage device, according to claim 1,
    wherein the second electrolyte comprises:
        a first material selected from $LiClO_4$, $LiAsF_6$, $LiBF_4$, $LiPF_6$, and $Li(C_2F_5SO_2)_2N$; and
        a second material selected from ethylene carbonate, propylene carbonate, dimethyl carbonate, diethyl carbonate, γ-butyrolactone, acetonitrile, dimethoxyethane, tetrahydrofuran, a silicon gel, an acrylic gel, an acrylonitrile gel, a polyethylene oxide, a polypropylene oxide, and a fluorine-based polymer.

5. The method of manufacturing the power storage device according to claim 1,
    wherein the silicon whisker is any of column-like shape, a cone-like shape, and a needle-like shape.

6. The method of manufacturing the power storage device, according to claim 1,
    wherein the removing the natural oxide film over the active material layer is performed by any of reactive ion etching method, inductively coupled plasma etching method, and wet etching method.

7. The method of manufacturing the power storage device according to claim 1,
    wherein the lithium iron phosphate has a NASICON structure.

8. The method of manufacturing the power storage device, according to claim 1,
    wherein the current collector where the active material layer is formed by CVD method is used for a negative electrode, and
    wherein the current collector is titanium.

9. A method of manufacturing a power storage device, comprising the steps of:
    forming an active material layer comprising a silicon whisker over a current collector, the active material layer being formed by CVD method;
    removing a natural oxide film over the active material layer;
    forming a solid electrolyte layer over the active material layer by sputtering lithium iron phosphate after the natural oxide film is removed; and
    providing a liquid electrolyte so as to be in contact with the solid electrolyte layer.

10. The method of manufacturing the power storage device, according to claim 9,
    wherein the solid electrolyte layer is a layer comprising at least one of lithium phosphate, lithium manganese phosphate, lithium chromium phosphate, and lithium phosphorus sulfide.

11. The method of manufacturing the power storage device, according to claim 9,
   wherein a thickness of the solid electrolyte layer is greater than or equal to 1 nm and less than or equal to 100 nm.

12. The method of manufacturing the power storage device, according to claim 9,
   wherein the liquid electrolyte comprises:
      a first material selected from $LiClO_4$, $LiAsF_6$, $LiBF_4$, $LiPF_6$, and $Li(C_2F_5SO_2)_2N$; and
      a second material selected from ethylene carbonate, propylene carbonate, dimethyl carbonate, diethyl carbonate, γ-butyrolactone, acetonitrile, dimethoxyethane, tetrahydrofuran, a silicon gel, an acrylic gel, an acrylonitrile gel, a polyethylene oxide, a polypropylene oxide, and a fluorine-based polymer.

13. The method of manufacturing the power storage device, according to claim 9,
   wherein the silicon whisker is any of column-like shape, a cone-like shape, and a needle-like shape.

14. The method of manufacturing the power storage device, according to claim 9,
   wherein the removing the natural oxide film over the active material layer is performed by any of reactive ion etching method, inductively coupled plasma etching method, and wet etching method.

15. The method of manufacturing the power storage device, according to claim 9,
   wherein the lithium iron phosphate has a NASICON structure.

16. The method of manufacturing the power storage device, according to claim 9,
   wherein the current collector where the active material layer is formed by CVD method is used for a negative electrode, and
   wherein the current collector is titanium.

* * * * *